May 12, 1925.  1,537,278
G. D. WILSON ET AL
MOLDING DEVICE FOR CONSTRUCTING CONCRETE WALLS
Filed April 17, 1922   4 Sheets-Sheet 3
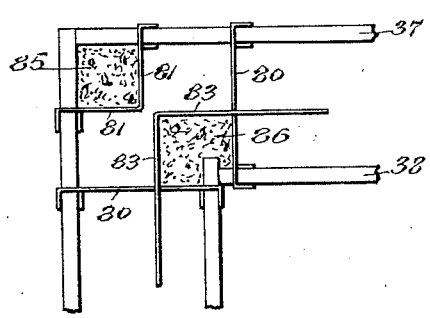
Fig. 6.
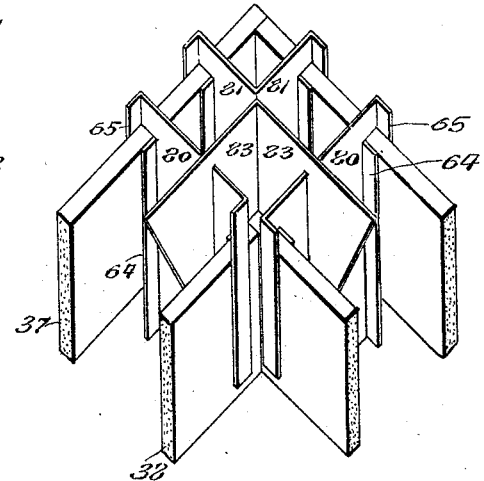
Fig. 7.
Fig. 5.
Inventors
George D. Wilson
Ray H. Gramm
by Beyer & Popp
Attorneys.

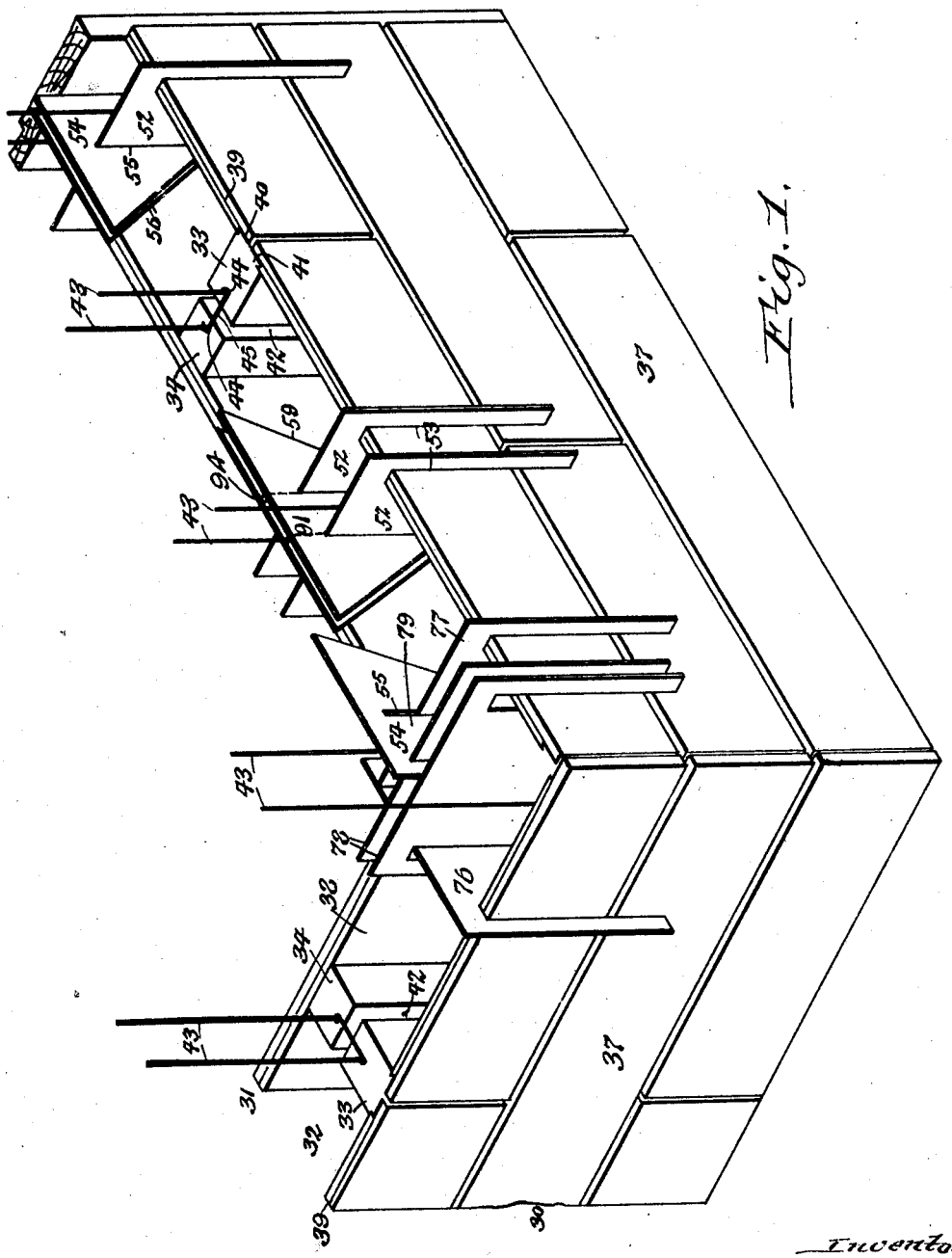

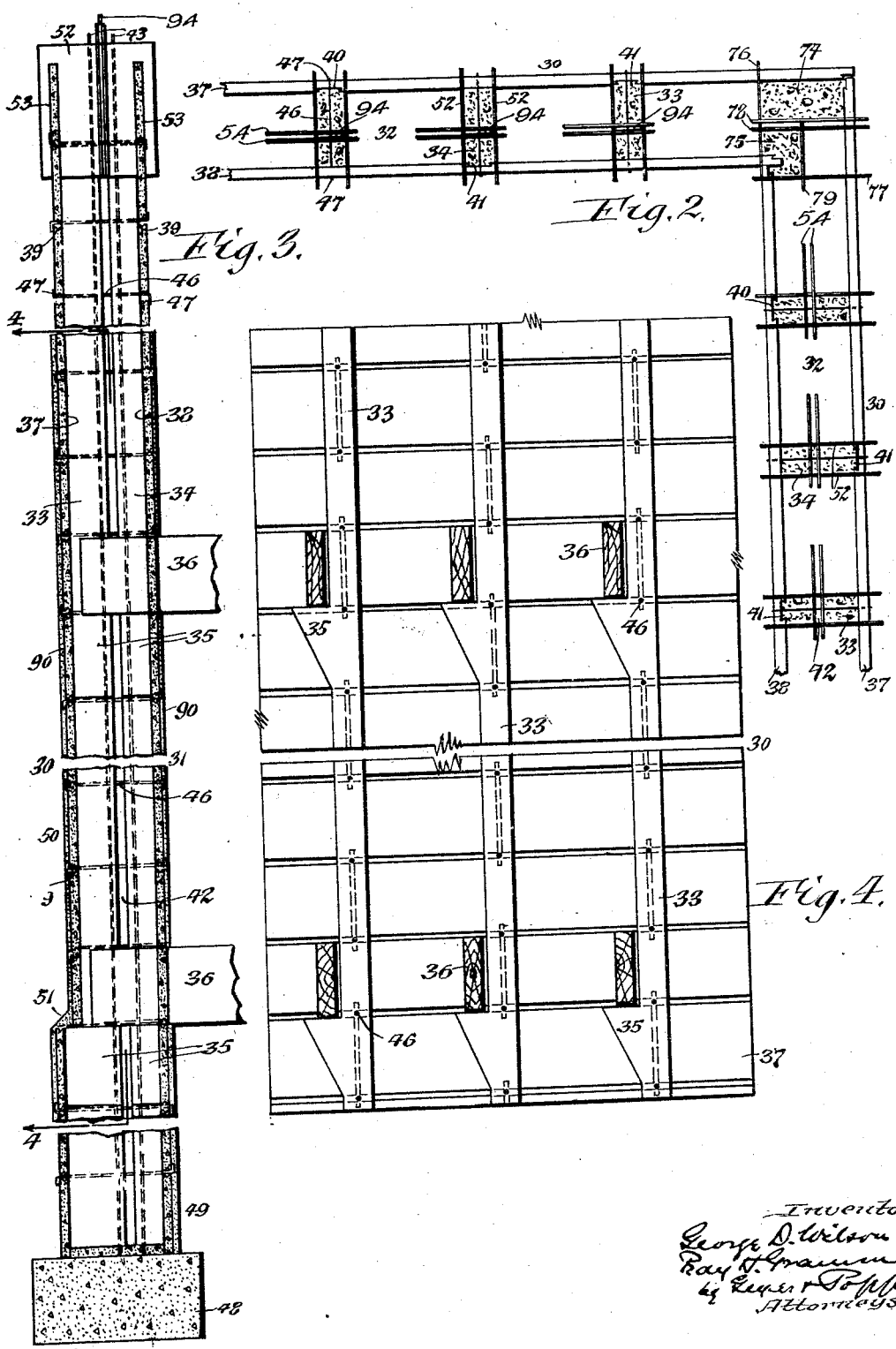

May 12, 1925.
G. D. WILSON ET AL
1,537,278
MOLDING DEVICE FOR CONSTRUCTING CONCRETE WALLS
Filed April 17, 1922    4 Sheets-Sheet 4
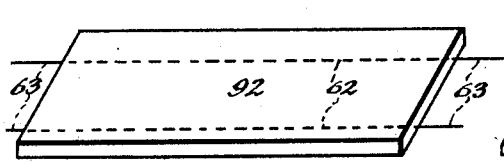
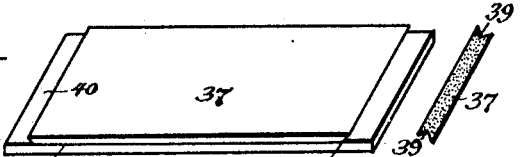
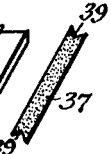
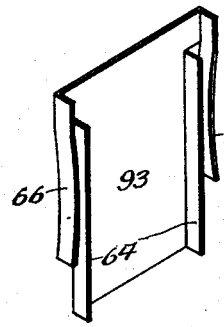
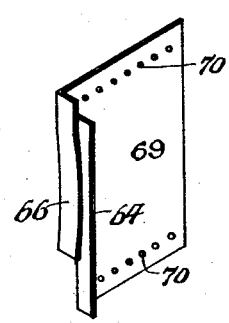
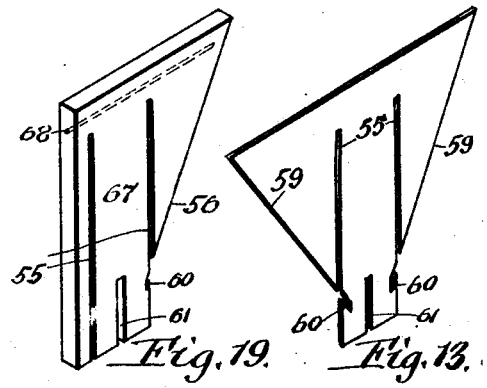
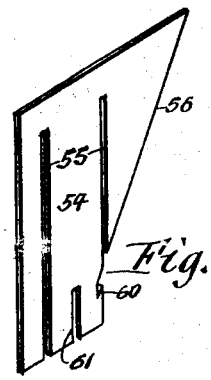
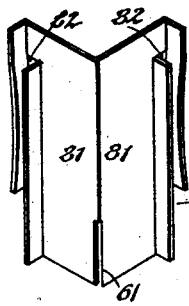
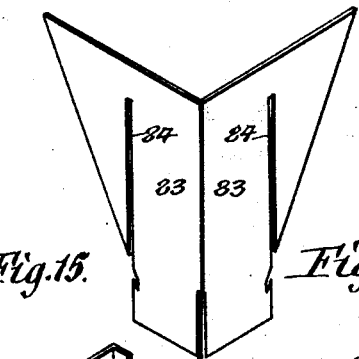
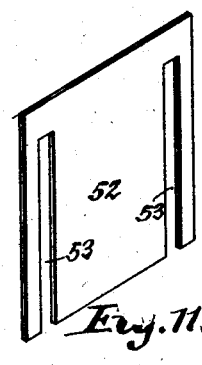
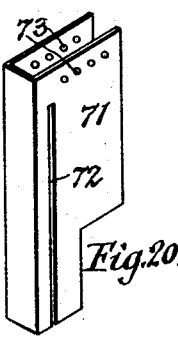
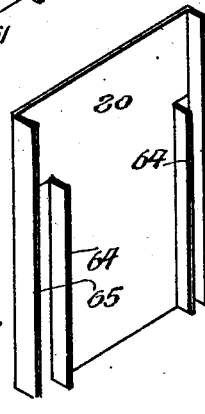
Inventors
George D. Wilson
Ray A. Gramm
Attorneys Patented May 12, 1925.

1,537,278

UNITED STATES PATENT OFFICE.

GEORGE D. WILSON AND RAY H. GRAMM, OF BUFFALO, NEW YORK, ASSIGNORS OF ONE-THIRD TO HARRY A. BROCAS, OF BUFFALO, NEW YORK.

MOLDING DEVICE FOR CONSTRUCTING CONCRETE WALLS.

Application filed April 17, 1922. Serial No. 553,806.

*To all whom it may concern:*

Be it known that we, GEORGE D. WILSON and RAY H. GRAMM, citizens of the United States, residing at Buffalo, in the county of Erie and State of New York, have invented new and useful Improvements in Molding Devices for Constructing Concrete Walls, of which the following is a specification.

This invention relates to a mold or molding device for constructing a wall having two shells of precast plates or slabs which are superposed or arranged in tiers and spaced apart, and field-cast studs formed against the inner sides of these shells, and more particularly to a wall of this character in which the studs are arranged in pairs and the members of which are arranged transversely in line relatively to the length of the wall.

It is the object of this invention to provide a mold whereby a wall of this character may be erected one course at a time with the accompanying studs and to accomplish this in an expeditious and economical manner and without the necessity of employing highly skilled help for this purpose, while at the same time producing a wall which is strong and durable and one in which the inner and outer sections of the same are insulated from each other by an air space so as to prevent the transmission of both moisture and temperature through the same.

In the accompanying drawings:

Figure 1 is a fragmentary perspective view of a building showing the manner of utilizing our improved mold. Figure 2 is a fragmentary plan view of the same. Figure 3 is a vertical cross section of the same. Figure 4 is a fragmentary vertical longitudinal section taken on line 4—4, Fig. 3. Figure 5 is a fragmentary vertical longitudinal section showing different manners of utilizing our invention. Figure 6 is a fragmentary top plan view of a corner between two walls, showing a modified form of our invention. Figure 7 is a fragmentary perspective view of the same. Figure 8 is a perspective view of one form of precast plate or slab which may be utilized in the formation of the shells of a wall which is erected by the use of our improved molding tools. Figure 9 is a cross section of the same. Figure 10 is a perspective view showing another form of precast plate or slab suitable for use in erecting a building by the use of our molding apparatus. Figure 11 is a perspective view of one form of transverse molding plate for use in our apparatus. Figure 12 is a similar view of one form of longitudinal molding plate forming part of our molding apparatus. Figure 13 is a similar view of another form of longitudinal molding plate which is constructed in accordance with our invention. Figures 14 and 15 are perspective views, showing forms of molding plates suitable for producing studs in the corner between two walls shown in Figs. 6 and 7. Figures 16 and 17 are perspective views of modified forms of transverse molding plates which embody our invention. Figure 18 is a perspective view showing a form of transverse molding plate which may be used in connection with a similar plate to form a transverse mold member capable of being widened or narrowed for adapting the same to different widths of walls. Figure 19 is a perspective view showing a longitudinal mold plate made of wood. Figure 20 is a similar view, showing a section of a longitudinal mold member made in the shape of the letter U in horizontal section and which is capable of longitudinal adjustment with reference to a companion member of similar construction for varying the length of this mold member to suit the width of the stud which is to be formed thereby against a shell of the wall. Figure 21 is a perspective view of one form of tie which may be utilized in the erection of a wall by the use of our improved mold for the purpose of connecting the studs on one wall section with those of another wall section.

Similar characters of reference indicate corresponding parts throughout the several views.

Our improved mold may be utilized for producing walls for buildings which may differ as to details of construction, and it is therefore to be understood that the drawings merely show one wall which is typical of the kind capable of being produced by our invention. In Figs. 1, 2, 3, 4 and 5, the wall comprises an outer shell 30, an inner shell 31 spaced apart from the outer shell by an intervening air gap 32, upright studs 33 engaging with the inner side of the outer shell, upright studs 34 engaging with the inner side of the inner shell, upwardly-facing haunches or shoulders 35 formed on some of the studs, and horizontal joints 36 passing through the inner shell and supported on the haunches.

The outer and inner shells are made up respectively of a plurality of precast plates or slabs 37, 38 of concrete of any suitable mixture, which plates are arranged in horizontal rows, the several rows being superposed on their horizontal edges so as to form tiers, and the plates of each row being so arranged that the vertical edges of adjacent plates face each other. On its horizontal edges each of the plates is provided with longitudinal grooves 39, so that when two plates of adjacent rows are placed edge to edge, one above the other, an undercut slot will be formed between the same. Each of the plates is also preferably provided on its inner side at opposite ends thereof with an undercut rabbet 40, so that when two plates in a row are assembled with their vertical ends in engagement, or nearly so, a dovetail locking recess will be formed at the vertical joint between such plates.

The studs are formed by pouring plastic concrete against the inner sides of the inner and outer shells of the wall, the plates of these shells being erected one row at a time and the sections and the posts being cast against the same after each row of plates has been assembled. These plates are assembled and the corresponding parts of the posts are formed thereagainst one course at a time until the building has reached the desired height.

In the preferred construction of the wall, the studs are arranged in pairs, the members of which are transversely in line. The vertical joints in the rows of wall plates in one shell are out of line with those of the other shell, so that these joints are staggered, and the vertical joints in adjacent rows of each shell are also arranged out of line with each other in the manner in which this is done when laying up a brick wall. Each stud is preferably formed on the rear side of a shell along the vertical joints between the rows of plates constituting the same, so that the front part of the plastic concrete forming the stud will fill into the dovetail locking recess of the respective plates and producing a locking key 41 therein which when dry and hardened with the stud, will securely couple the respective wall shell and stud and prevent separation thereof.

The opposing inner vertical sides of the members of each pair of studs are separated from each other by an intervening air space or gap 42 which together with the air gap between the two shells of the wall produces a complete air insulation between the inner and outer concrete sections of the wall, thus rendering the same absolutely proof against transmitting moisture from one shell to another, and avoiding dampness in the building, and also preventing the transmission of temperature, thereby enabling the building to be heated economically in the winter time and also keeping the same cool in the summer time.

Each of the studs is preferably reinforced by an upright metal rod 43 embedded in the same and the adjacent studs and the plates of the two shells are held together for the purpose of producing a substantial structure by tying means which may be of any suitable construction. One form of tying means shown in the drawings for accomplishing this purpose consists of a plurality of ties such as shown in Fig. 1, each of which has a horizontal body 45 extending across the space between two adjacent studs and having its opposite ends constructed in the form of hooks 44 which are embedded in these studs and embrace the reinforcing rods 43 therein.

If desired, each tie may consist of a rod 46 extending through both studs of a pair and through the joints between superposed shell slabs and provided at its ends with hooks 47, as shown in Fig. 21, which engage with the outer sides of these shells, as shown in Figs. 2 and 3. After the shells and studs are thus erected, the front surfaces of the shells may be coated with plaster, as shown at 90 in Fig. 3.

We have so designed our improved mold that the same may be employed for erecting a straight run of wall of the character just described, and also to join two of such walls when arranged at right angles to each other, so as to form a corner between the same. In Figs. 1 and 2, our invention is shown in connection with a building having two walls arranged at an angle to each other, these particular walls forming a right angle.

The members of one form of our improved mold and the manner of utilizing the same for erecting a wall, are constructed as follows:

Preparatory to beginning the erection of a wall, a foundation 48 of any suitable character is first put in the ground and thereafter the wall is erected thereon, which wall in its preferred form is made somewhat wider on its lower part, as shown at 49 in Fig. 3, while its upper part 50 is made narrower and thereby forms a water table 51 between the wide lower and narrow upper part of the wall.

In the erection of a wall, the lowermost horizontal rows of both shells are first arranged upon the foundation with the precast plates or slabs in each row arranged edge to edge, or substantially so, which slabs are held in an upright position and in the proper spaced relation by means of transverse mold plates which latter also operate to form parts of the mold cavities in which the fresh or plastic material is poured for the formation of the studs. In the form of these transverse mold plates shown in Figs. 1 and 11, each plate is constructed of a single sheet 52 of metal which is provided adjacent to its opposite vertical edges with upright or vertical slots 53 extending downwardly to the lower edge thereof. Each of these plates is passed with its opposite slots downwardly over corresponding precast slabs of the two shells, so that this plate embraces both of these slabs and holds them in an upright operative position relatively to each other. Two of such mold plates engage two companion precast slabs or plates of both shells, which molding plates are preferably arranged parallel and close together, so that they form the two transverse sides of one or two stud mold cavities.

The transverse mold plates are held in place in a direction lengthwise of the wall by one or more longitudinal mold plates, one plate being used if it is desired to cast a stud against either side of one of the shells, but two of such longitudinal mold plates being employed if it is desired to cast two studs transversely in line against the inner sides of the corresponding precast plates of the two shells. In Figs. 2 and 3 of the drawings, two longitudinal mold plates are associated with each pair of companion transverse plates, which longitudinal plates operate to couple these transverse plates and are separated from each other crosswise of the wall, so that a longitudinal air gap or space is formed between the pair of longitudinal plates, and each of the latter, together with the adjacent parts of the respective transverse plates and one of the shell plates, forms a mold cavity in which the plastic material is poured to form a field-cast stud against the inner side of one of the shells. Although these longitudinal mold plates may be variously constructed, that, for example, which is shown in Fig. 12, consists of an upright sheet 54 of metal which is provided adjacent to its opposite vertical edges with upright slots 55, 55, which extend to the lower edge of this plate, so that the same may be coupled with two transverse plates by passing this longitudinal plate with its vertical slots downwardly over the respective transverse plates, whereby these several plates are coupled with each other in a direction lengthwise of the wall to form the mold cavities therebetween, as shown at the left hand side of Fig. 5. These transverse and longitudinal mold plates are preferably so assembled that the mold cavities formed thereby are in line with and open toward the vertical joints between adjacent precast shell slabs, so that upon pouring the plastic concrete into these mold cavities, flush with the upper ends of the respective slabs, concrete posts will be formed which are interlocked with the opposing ends of the slabs by means of the dove-tail keys, as shown at 41. In order to hold the plates 54 against moving toward each other transversely of the wall, the same may be fitted on the plates 52 sufficiently tight to be held in place frictionally or a retaining block 94 may be inserted in the space between the intersecting transverse plates 52 and the longitudinal plates 54 which space forms part of the air gap 42, as shown in Figures 1, 2, 3 and 5.

In order to enable these longitudinal mold plates to be used for forming the upwardly-facing shoulders or haunches upon the studs, one or both of the lateral edges of the longitudinal plates are provided with inclined bearing faces against which the transverse plates are adapted to engage and be arranged at an angle. One such inclined bearing 56 engaged by an inclined transverse mold plate 57 is shown at the center of Fig. 5, and thereby form a mold cavity which flares or enlarges upwardly and thereby produce not only a part of the stud but also an upwardly-facing haunch or shoulder upon filling this cavity with plastic concrete up to a line flush with the upper edge of the respective shell slabs. If it is desired to form two haunches on opposite sides of the same part of the stud, each of the longitudinal mold plates 91 may be provided with inclined bearing faces 59 on its opposite lateral sides, as shown in Fig. 13, which faces when engaged by the two transverse inclined mold plates 58, as shown at the right hand of Fig. 5, will produce a mold cavity which flares upwardly and when filled with plastic concrete will produce a part of a post having haunches or shoulders on opposite sides thereof.

In order to hold these transverse mold plates reliably in engagement with the inclined bearing faces of the longitudinal wall plates, the lower parts of these longitudinal plates are provided with notches 60 which receive the lower edges of the transverse mold plates.

Each of the longitudinal mold plates is preferably provided with a short vertical slot 61 in its lower edge which is adapted to receive a tie which is placed on top of two studs preparatory to being embedded therein to connect the same.

After one course of the wall has been thus laid and the studs have become sufficiently hardened, another row of wall plates is placed upon these forming the previous or finished part of the wall, and these additional plates are then held in their proper spaced relation by first applying thereto a plurality of pairs of transverse mold plates, as previously described with reference to the preceding rows of mold plates, and then the longitudinal mold plates are applied to the transverse mold plates for holding the latter in place and completing the mold cavities preparatory to casting additional portions of the studs and interlocking the same with the respective rows of shell slabs. The succeeding courses of the wall are built in like manner as just described, the mold plates being removed from each lower course of the wall and re-applied to the next higher course of shell slabs or plates preparatory to casting the studs thereagainst, until the wall has reached the desired height.

The upright reinforcing rods 43 are placed in the mold cavities of the studs before pouring the concrete into the same and the ties which connect these studs are engaged with the upper ends of the finished parts of the studs flush with the tops of each course of shell plates, so that as successive portions of the studs are formed, the end portions of these ties will become embedded in the concrete studs and securely unite the same.

Instead of providing the opposite vertical edges of each shell slab with a rabbet, each of the slabs 92 may be provided with longitudinal reinforcing wires 62, the ends 63 of which may be turned inwardly at the joints between adjacent slabs and embedded in the concrete which forms the studs, such a slab being shown in Fig. 10.

If desired, the upright slots in the transverse mold plates 80 may be provided with outer and inner flanges 65, 64, which are adapted to engage with the outer and inner sides of the precast shell slabs, such a transverse mold plate being shown for instance in Fig. 17. As shown in Fig. 16, the outer flanges 66 of the mold plate 93 may also be constructed to form springs which are adapted to engage yieldingly with the outer sides of the respective shell slabs, and thereby adapt themselves to any irregularities or inequalities which may exist in the thickness of the shell slabs and insure holding of these shell slabs reliably against displacement preparatory to pouring the concrete studs against the same.

Instead of using sheet metal as the material for making the longitudinal mold plates, each of these plates may be made of wood, as shown at 67 in Fig. 19, in which case these plates would be considerably thicker than if made of sheet metal. When thus made of wood, the same are preferably reinforced by passing a wire 68 horizontally and lengthwise through the upper parts of the wooden mold plate and thereby prevent the same from splitting or becoming broken.

The transverse mold plates may also be constructed in sections which are capable of transverse adjustment relatively to each other, in order to adapt the same plates for making walls of different widths. A section of such a transverse mold plate is shown at 69 in Fig. 18, which section is provided at its upper and lower edges with horizontal rows of openings 70. By passing bolts or similar fastenings through the companion openings 70 of a pair of sections of a transverse mold plate, such as that shown in Fig. 18, it is possible to either narrow or widen the transverse mold plate to suit the width of the wall which is to be produced.

The longitudinal mold plates may also be made U-shaped in horizontal section of a single sheet of metal, as shown at 71 in Fig. 20. Such a construction lends itself to making a longitudinal mold member which is capable of contraction and expansion to suit different spaced relations of a pair of transverse mold plates, for which purpose each of these sections is provided adjacent to one of its vertical edges with a vertical slot 72 adapted to engage one of the transverse mold plates, while its upper part is provided with two horizontal rows 73 of openings whereby the same may be adjustably connected with a similar longitudinal mold member by passing one or more bolts through corresponding openings in the same.

When constructing a building in which two walls are arranged at right angles to each other, it is preferable to have one post or stud 74 arranged in the concave angle of the corner between the outer shells of both walls and another stud 75 arranged on the convex angle of the corner of the two inner shells of these walls, as shown in Fig. 2. For the purpose of producing the mold cavities in which these studs are constructed, one transverse mold plate 76 is employed for connecting the companion shell slabs of one wall, another transverse mold plate 77 is used for connecting the companion shell slabs of the other wall which is arranged at right angles to the first-mentioned one, a pair of longitudinal mold plates 78 is employed for connecting the transverse mold plate 76 of one wall with the outer shell of the other wall, and a single longitudinal mold plate 79 is employed for connecting one member of the pair of longitudinal plates 78 just described with the transverse plate 77. The several transverse and longitudinal mold plates just described, interlock with each other in substantially the same manner as that described with reference to the construction of the mold plates for forming transversely alined pairs of concrete studs on the inner sides of the precast slabs on both wall sections.

Instead of forming the corner studs or posts in the manner shown in Figs. 1 and 2, this may be accomplished by the means shown in Figs. 6, 7, 14, 15 and 17, in which case two transverse mold plates 80 are employed which are arranged at right angles to each other and each of which connects two companion slabs of a wall adjacent to the corner between the same and another wall, an outer angular mold plate is employed having two wings 81, 81, provided with vertical slots 82 whereby the same are engaged over the outer shell slabs or plates of both walls, and an inner angular mold plate is employed having two wings 83, 83 which are arranged at right angles to each other, and provided with vertical slots 84 engaging over the transverse mold plate 80, the corners of the angular outer mold plate 81 and the inner angular mold plate 83 being opposed to each other but spaced apart and thereby forming mold cavities in connection with the corners of the outer and inner sets of shell slabs, as shown in Figs. 6 and 7, in which field-cast studs 85, 86 are formed for the purpose of connecting the slabs of these shells and supporting the same.

These several mold members are of simple and inexpensive construction which can be easily assembled by help which is not highly skilled and enable a wall having the superior characteristics above referred to to be produced at comparatively low cost.

By slotting the transverse and longitudinal mold plates, the transverse plates when placed over the precast shell plates are supported by the latter without the use of any additional means for this purpose, and the longitudinal mold plates are supported by the transverse plates without any other additional means, thereby simplifying the construction and reducing the cost accordingly.

We claim as our invention:

1. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates.

2. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and two longitudinal mold plates connecting the transverse plates between the ends of the latter and forming with the same and the shell plates, two mold cavities in which the plastic material is placed for forming two transversely opposite studs on the inner sides of said shells.

3. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates, each of said transverse mold plates being provided with vertical slots which extend to the lower edge of the same and which are adapted to receive the shell plates from the upper edge of the latter.

4. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates, each of said transverse mold plates being provided with vertical slots which extend to the lower edge of the same and which are adapted to receive the shell plates from the upper edge of the latter and said longitudinal mold plate being provided with vertical slots which extend to the lower edge thereof and which are adapted to receive the transverse mold plates from the upper edge of the latter.

5. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and two longitudinal mold plates connecting the transverse plates between the ends of the latter and forming with the same and the shell plates two mold cavities in which the plastic material is placed for forming two transversely opposite studs on the inner sides of said shells, each of said transverse mold plates being provided with vertical slots which extend to the lower edge of the same and which are adapted to receive the shell plates from the upper edge of the latter, and each of said longitudinal mold plates having vertical slots which extend to the lower edge thereof and which are adapted to receive the transverse mold plates from the upper edges of the same.

6. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates, each of said transverse mold plates being provided with vertical slots which extend to the lower edge of the same and which are adapted to receive the shell plates from the upper edge of the latter and those parts of each transverse mold plate outside of the shell plates being constructed in the form of spring fingers which are adapted to engage yieldingly with the outer side of said shell plates.

7. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates, each of said transverse wall plates being provided with vertical slots which extend to the lower edge of the same and which are adapted to receive the shell plates from the upper edge of the latter, and each of said transverse mold plates being provided along its slots with flanges which are adapted to engage the flat surfaces of said shell plates.

8. A molding device for constructing a wall having two shells of precast plates arranged in tiers and spaced apart and field cast studs formed against the inner sides of said shells, said mold comprising a pair of transverse mold plates which are adapted to connect at opposite ends with the plates of both shells and are spaced apart, and a longitudinal mold plate connecting said transverse plates and forming with the latter and the shell plates a mold cavity in which the plastic material is placed which forms a stud on the inner side of one of the tiers of shell plates, said longitudinal plate having an inclined edge which is adapted to be engaged by one of said transverse plates in an inclined position for forming a mold cavity in which a stud having an upwardly facing haunch or shoulder is produced.

9. A molding device for constructing a wall having two shells of precast plates arranged in tiers and spaced apart and field cast studs formed against the inner sides of said shells, said mold comprising mold plates which interlock with each other and some of which interlock with said shell plates and form with the latter mold cavities in which the plastic material is placed for forming said studs.

10. A molding device for constructing the corner of a building having two walls each of which has inner and outer upright shells of superposed precast plates which are spaced apart, and field cast studs formed against the inner corners of said shells, comprising two transverse mold plates arranged at an angle to each other and embracing the shells of the walls at an angle to one another, a pair of longitudinal mold plates connecting the transverse mold plate of the outer shell of one wall with the outer shell of the other wall, and a single longitudinal mold plate connecting one of said pairs of longitudinal plates with the transverse mold plate associated with the outer shell of the other wall.

11. A molding device for constructing a wall having two shells of precast plates, and field-cast studs formed against the inner sides of said plates, said mold comprising a pair of removable transverse mold plates which are detachably connected at opposite ends with said shell plates to hold the latter in place and form therewith a mold cavity in which each of said studs is cast.

GEORGE D. WILSON.
RAY H. GRAMM.